United States Patent
Yamamoto

[11] Patent Number: 6,012,559
[45] Date of Patent: Jan. 11, 2000

[54] COUPLING MECHANISM

[75] Inventor: Kozo Yamamoto, Daito, Japan

[73] Assignee: Exedy Corporation, Osaka, Japan

[21] Appl. No.: 09/121,833

[22] Filed: Jul. 24, 1998

[30] Foreign Application Priority Data

Aug. 1, 1997 [JP] Japan .................................. 9-207936

[51] Int. Cl.$^7$ .................................................. F16F 15/30
[52] U.S. Cl. .......................................... 192/30 V; 74/574
[58] Field of Search ................................ 192/30 V, 48.3, 192/55.61, 70.17, 89.22, 89.23, 214; 74/574

[56] References Cited

U.S. PATENT DOCUMENTS

| | | | |
|---|---|---|---|
| 1,723,886 | 8/1929 | Pfaff ...................................... | 192/70.17 |
| 1,828,508 | 10/1931 | Murray . | |
| 2,958,526 | 11/1960 | Ulderup et al. ........................... | 267/63 |
| 3,209,875 | 10/1965 | Altmann .................................... | 192/66 |
| 4,157,227 | 6/1979 | Hahle ....................................... | 403/228 |
| 4,796,740 | 1/1989 | Fukushima ............................. | 192/30 V |
| 4,828,090 | 5/1989 | Matsushita ................................. | 192/84 |
| 4,842,116 | 6/1989 | Fukushima ............................. | 192/106.2 |
| 4,844,224 | 7/1989 | Fukushima ....................... | 192/30 V X |
| 4,844,225 | 7/1989 | Fukushima ....................... | 192/30 V X |
| 4,846,323 | 7/1989 | Fukushima ............................. | 192/30 V |
| 4,846,328 | 7/1989 | Fukushima ....................... | 192/30 V X |
| 5,135,089 | 8/1992 | Kovac .................................. | 192/70.17 |
| 5,152,510 | 10/1992 | Komabashiri ......................... | 267/141.2 |
| 5,168,971 | 12/1992 | Kovac .................................... | 192/30 V |
| 5,190,269 | 3/1993 | Ikeda et al. .......................... | 267/140.12 |
| 5,499,703 | 3/1996 | Kii et al. ............................ | 192/30 V X |
| 5,511,446 | 4/1996 | Kajitani et al. ......................... | 74/573 F |
| 5,669,820 | 9/1997 | Fukushima ................................ | 464/98 |
| 5,692,591 | 12/1997 | Kimura ............................... | 192/84.941 |
| 5,797,297 | 8/1998 | Mokdad .................................... | 74/574 |

FOREIGN PATENT DOCUMENTS

| | | |
|---|---|---|
| 648031 | 6/1994 | Japan . |
| 2153929 | 8/1985 | United Kingdom ................. 192/30 V |

*Primary Examiner*—Rodney H. Bonck
*Attorney, Agent, or Firm*—Shinjyu Global IP Counselors, LLP

[57] ABSTRACT

An inertia adding assembly is provided in a coupling mechanism 91 to reduce weight and cost for coupling a crankshaft of an engine to an input shaft of a transmission. The coupling mechanism 91 is basically provided with a flywheel assembly 60, a clutch disk assembly 5, a clutch cover assembly 4 and an inertia adding assembly 70. The clutch disk assembly 5 has a friction facing 5a, a spline hub 5c coupled to an input shaft 9 of a transmission and a damper having a maximum allowable operation angle of $\theta_{max}$. The clutch cover assembly 4 is designed to frictionally engage the flywheel 61 with the friction facing 5a. The inertia adding assembly 70 has a mass portion 71 and a sub-clutch 73 for releasing and interlocking the input shaft 9 and the mass portion 71 together. The sub-clutch 73 has a torque transmission capacity smaller than a torque transmitted between the friction facing 5a and the spline hub 5c when the damper attains an angle of $\theta_{max}$.

24 Claims, 6 Drawing Sheets

COUPLING MECHANISM

BACKGROUND OF THE INVENTION

1. Field of the Invention

The invention generally relates to a coupling mechanism. More specifically, the present invention relates to a coupling mechanism provided with an inertia adding assembly which is interlocked with an input shaft of a transmission to change a vibration system for avoiding resonance and thereby damping a vibration.

2. Background Information

Japanese Patent Publication No. 2-32890 and others have disclosed prior arts relating to a coupling mechanism provided with an inertia adding assembly, which is interlocked with an input shaft of a transmission to change a vibration system of the transmission for damping a vibration.

In these prior art devices, a clutch is engaged when a pressure plate of a clutch cover assembly presses a frictional engagement portion (clutch disk) of a clutch disk assembly against a flywheel of a flywheel assembly, and a sub-clutch (auxiliary clutch) is in the engaged state while the clutch is in the engaged state. In this state, a mass portion (mass member) rotates together with an input shaft of a transmission (i.e., a input shaft of the transmission) so that an additional inertia moment is added to the input shaft of the transmission, and a torque variation of an engine, which is transmitted to the input shaft of the transmission, is reduced. When the clutch is in the disengaged state, the sub-clutch is also in the disengaged state so that the additional inertia moment of the mass portion is not added to the input shaft of the transmission. Therefore, presence of the mass portion does not affect a shift feeling of the transmission.

In the above prior art, the sub-clutch is in the engaged state while the clutch is in the engaged state, and the sub-clutch is in the disengaged state while the clutch is in the disengaged state.

In the above structure of the present invention, however, a large torque is transmitted to the mass portion from the input shaft of the transmission through the sub-clutch when a large torque is transmitted between a crankshaft of the engine and the input shaft of the transmission, e.g., in a starting operation. Therefore, it is necessary to increase the strength of the structures of the sub-clutch and the mass portion for withstanding such a large torque. This increases a weight and a cost of the inertia adding assembly.

In view of the above, there exists a need for a coupling mechanism, which overcomes the above mentioned problems in the prior art. This invention addresses this need in the prior art as well as other needs, which will become apparent to those skilled in the art from this disclosure.

SUMMARY OF THE INVENTION

An object of the present invention is to reduce weight and cost of an inertia adding assembly in a coupling mechanism, which can couple a crankshaft of an engine and an input shaft of a transmission.

According to a first aspect of the present invention, a coupling mechanism for coupling a crankshaft of an engine to an input shaft of a transmission includes a flywheel assembly, a clutch disk assembly, a clutch cover assembly and an inertia adding assembly. The flywheel assembly is non-rotatably coupled to the crankshaft of the engine. The clutch disk assembly has a frictional engagement portion, a coupling portion and a damper having a maximum allowable operation angle of $\theta_{max}$. The coupling portion is coupled to the input shaft of the transmission. The damper is arranged between the frictional engagement portion and the coupling portion for dampening a torque variation. The clutch cover assembly is fixedly coupled to the flywheel assembly for pressing the frictional engagement portion of the clutch disk assembly toward the flywheel assembly and thereby frictionally engaging the flywheel assembly with the frictional engagement portion of the clutch disk assembly. The inertia adding assembly has a mass portion and a sub-clutch. The mass portion can rotate in accordance with rotation of the input shaft of the transmission. The sub-clutch releases interlocking between the input shaft of the transmission and the mass portion when the flywheel assembly and the frictional engagement portion of the clutch disk assembly are disengaged from each other. The sub-clutch has a torque transmission capacity T which is smaller than a torque transmitted between the frictional engagement portion of the clutch disk assembly and the coupling portion of the clutch disk assembly when the damper of the clutch disk assembly attains the angle of $\theta_{max}$.

The purpose of this inertia adding assembly of the coupling mechanism is to change a vibration system for avoiding resonance and thereby suppressing vibrations when the coupling mechanism is interlocked with the input shaft of the transmission. According to this coupling mechanism, the torque supplied from the crankshaft of the engine is transmitted to the input shaft of the transmission through the frictional engagement portion of the clutch disk assembly.

When the frictional engagement portion of the clutch disk assembly is frictionally engaged with the flywheel assembly, the sub-clutch is also engaged. Therefore, the mass portion is interlocked with the input shaft of the transmission. Thereby, an inertia moment of the mass portion is added to the input shaft of the transmission so that the vibration system of the transmission changes, and thereby resonance can be avoided. In this manner, it is possible to reduce the vibrations of the transmission caused by the torque variation of the engine. When the frictional engagement portion of the clutch disk assembly is disengaged from the flywheel assembly, the sub-clutch is also disengaged. Therefore, the inertia moment of the mass portion is no longer added to the input shaft of the transmission so that presence of the mass portion hardly exerts an adverse influence on the shifting of the transmission.

When a large torque is transmitted between the crankshaft of the engine and the input shaft of the transmission, for example, during a starting operation, the damper of the clutch disk assembly attains the maximum allowable operation angle of $\theta_{max}$. In the clutch disk assembly, this large torque is transmitted primarily from the frictional engagement portion to the coupling portion through a stop mechanism and others. However, the large torque transmitted to the input shaft of the transmission is larger than the torque transmission capacity of the sub-clutch so that the mass portion of the inertia adding assembly is not completely interlocked with the input shaft of the transmission. Thus, a maximum external force acting on the mass portion and the sub-clutch is smaller than that in the case where the sub-clutch has a sufficiently large torque transmission capacity and the mass portion is completely interlocked with the input shaft of the transmission. Accordingly, structures of the sub-clutch and the mass portion can be reduced in weight, compared with the prior art sub-clutches of sufficient torque transmission capacity and the mass portions which are completely interlocked with the input shaft of the transmission. Also, the costs of the sub-clutch and the mass portion can be reduced.

In this coupling mechanism, the inertia adding assembly is not completely interlocked with the input shaft of the transmission when the damper of the clutch disk assembly attains the maximum allowable operation angle of $\theta_{max}$. However, during a neutral state of the transmission and a normal driving, the damper of the clutch disk assembly operates with an angle not exceeding the maximum allowable operation angle of $\theta_{max}$. Therefore, a majority of noises during the neutral state of the transmission and normal driving are suppressed.

According to a second aspect of the present invention, the coupling mechanism of the first aspect of the present invention further has such a feature that the torque transmission capacity (T) of the sub-clutch is substantially equal to or smaller than a value expressed by the following formula:

$$(I) \cdot (\theta_0)$$

where I represents an inertia moment of the mass portion of the inertia adding assembly around a rotation axis and that $\theta_0$ represents an operation angle $\theta_0$ of the damper caused by the torque variation of the engine.

According to the above aspect of the present invention, the mass portion of the inertia adding assembly is reliably interlocked with the input shaft of the transmission when the damper operates in response to the torque variation of the engine. Accordingly, in an engine speed range wherein the torque variation of the engine would cause resonance in the transmission if the mass portion were not interlocked with the input shaft of the transmission, the inertia moment of the mass portion reliably changes the vibration system of the transmission, and avoids the resonance due to the torque variation of the transmission.

According to a third aspect of the present invention, a coupling mechanism for coupling a crankshaft of an engine and an input shaft of a transmission includes a flywheel assembly, a clutch disk assembly, a clutch cover assembly and an inertia adding assembly. The inertia adding assembly in this embodiment acts as a dynamic damper. The flywheel assembly is non-rotatably coupled to the crankshaft of the engine. The clutch disk assembly has a frictional engagement portion, a coupling portion and a damper having a maximum allowable operation angle of $\theta_{max}$. The coupling portion is coupled to the input shaft of the transmission. The damper is arranged between the frictional engagement portion and the coupling portion for damping a torque variation. The clutch cover assembly is fixedly coupled to the flywheel assembly for pressing the frictional engagement portion of the clutch disk assembly toward the flywheel assembly and thereby frictionally engaging the flywheel assembly with the frictional engagement portion of the clutch disk assembly. The inertia adding assembly or dynamic damper has a mass portion, a sub-clutch and an elastic portion. The mass portion can rotate in accordance with rotation of the input shaft of the transmission. The sub-clutch releases interlocking between the input shaft of the transmission and the mass portion when the flywheel assembly and the frictional engagement portion of the clutch disk assembly are disengaged from each other. The elastic portion elastically couples the input shaft of the transmission and the mass portion in the rotating direction when the sub-clutch interlocks the input shaft of the transmission with the mass portion. The sub-clutch has a torque transmission capacity T smaller than a torque transmitted between the frictional engagement portion of the clutch disk assembly and the coupling portion of the clutch disk assembly when the damper of the clutch disk assembly attains the angle of $\theta_{max}$.

The purpose of the dynamic damper of this coupling mechanism is to suppress noises during a neutral position of the transmission and a driving when interlocked with the input shaft of the transmission. In this aspect of the present invention, mere addition of an inertia is not employed for avoiding resonance, but the dynamic damper is also used for avoiding resonance. Therefore, it is possible to dampen a vibration of the transmission in a partial rotation speed range. Accordingly, the vibration can be reduced to a level, which cannot be attained by merely avoiding the resonance. According to this coupling mechanism of the present invention, the torque supplied from the crankshaft of the engine is transmitted to the input shaft of the transmission through the frictional engagement portion of the clutch disk assembly.

When the frictional engagement portion of the clutch disk assembly is frictionally engaged with the flywheel assembly, the sub-clutch is also engaged. Therefore, the mass portion is interlocked with the input shaft of the transmission. Thereby, the dynamic damper is added to the input shaft of the transmission so that the vibration of the transmission is damped. In this manner, it is possible to reduce the torque variation of the engine transmitted to the transmission. When the clutch cover assembly disengages the frictional engagement portion of the clutch disk assembly from the flywheel assembly, the sub-clutch is also disengaged. Therefore, the inertia moment of the mass portion and the elastic portion is no longer added to the input shaft of the transmission so that presence of the dynamic damper hardly exerts an adverse influence on the shifting of the transmission.

When a large torque is transmitted between the crankshaft of the engine and the input shaft of the transmission, for example, in a starting operation, the damper of the clutch disk assembly attains the maximum allowable operation angle of $\theta_{max}$. In the clutch disk assembly, this large torque is usually transmitted from the frictional engagement portion to the coupling portion through a stop mechanism and others without passing through the damper. However, the large torque transmitted to the input shaft of the transmission is larger than the torque transmission capacity of the sub-clutch so that the dynamic damper is not completely interlocked with the input shaft of the transmission. Thus, a maximum external force acting on the elastic portion and the sub-clutch is smaller than that in the case where the sub-clutch has a sufficiently large torque transmission capacity and the dynamic damper is completely interlocked with the input shaft of the transmission. Accordingly, a structure of the dynamic damper can be reduced in weight, compared with the case where the sub-clutch has a sufficient torque transmission capacity and the dynamic damper is completely interlocked with the input shaft of the transmission. Also, the cost of the dynamic damper can be reduced.

In this coupling mechanism, the dynamic damper or inertia adding assembly is not completely interlocked with the input shaft of the transmission when the damper of the clutch disk assembly attains the maximum allowable operation angle of $\theta_{max}$. However, during a neutral state of the transmission and a normal driving, the damper of the clutch disk assembly operates with an angle not exceeding the maximum allowable operation angle of $\theta_{max}$. Therefore, a majority of noises during the neutral state of the transmission and normal driving are suppressed.

The foregoing and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
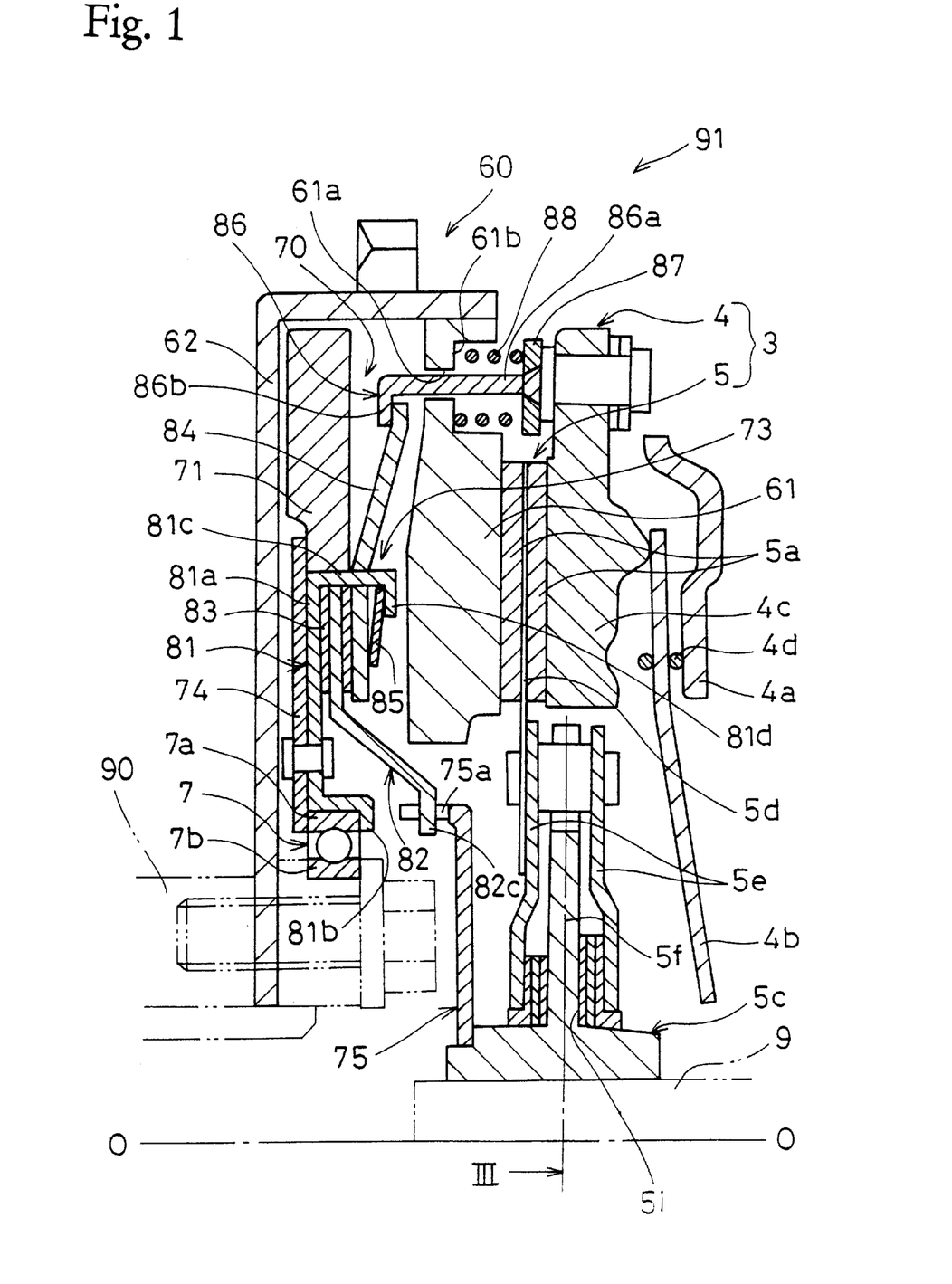
FIG. 1 is a partial cross-sectional view of a coupling mechanism in accordance with a first embodiment of the present invention.

Referring initially to FIG. 1, a cross-sectional view of a coupling mechanism 91 is illustrated in accordance with a first embodiment of the present invention. The coupling mechanism 91 is provided for disengageably engaging a crankshaft 90 of an engine from an input shaft 9 of a transmission. Coupling mechanism 91 includes an inertia adding assembly 70, which is connected to a input shaft 9 of the transmission via a sub-clutch 73. The inertia adding assembly 70 is designed to suppress torque variations of the engine and resonance of the transmission.

The coupling mechanism 91 is basically formed of a flywheel assembly 60, ; main clutch 3 and the inertia adding assembly 70. The main clutch 3 is formed of a clutch cover assembly 4 and a clutch disk assembly 5. The inertia adding assembly 70 has a sub-clutch 73 which releasably couples the inertia adding assembly 70 to the input shaft 9 of the transmission. A rotation axis of this coupling mechanism 91 is represented by line O—O in FIG. 1.

The flywheel assembly 60 is non-rotatably coupled to the crankshaft 90 of the engine, and is basically formed of a flywheel 61 and a housing member 62. The flywheel 61 and the housing member 62 are connected together at their outer peripheral portions. The flywheel 61 is also provided with a plurality of recessed concavities 61b at its outer peripheral portion. The recessed concavities 61b of the flywheel 61 are located on a transmission side 61b of the flywheel 61 (right side of the flywheel 61 as viewed in FIG. 1). The flywheel 61 also has a plurality of apertures 61a, which extend axially through the flywheel 61 from the centers of the bottom surfaces (i.e., surfaces near the engine and thus left end surfaces as viewed in FIG. 1) of the recessed concavities 61b, respectively. The inner peripheral end of the housing member 62 is fixedly coupled to the crankshaft 90 of the engine by circumferentially equally spaced bolts for rotating therewith.

Referring to FIGS. 1, the clutch cover assembly 4 of the main clutch 3 is basically formed of a clutch cover 4a, an annular diaphragm spring 4b and a pressure a plate 4c. The pressure plate 4c is normally biased toward the engine by the diaphragm spring 4b. Thus, the clutch disk assembly 5 is normally in the clutch engaged state. The clutch cover 4a is fixedly coupled at its outer peripheral portion to an end of the flywheel 61 near the transmission side of the flywheel 61 in a substantially conventional manner. The inner peripheral portion of the clutch cover 4a supports the radially middle portion of the diaphragm spring 4b via wire rings 4d in a conventional manner. The pressure plate 4c is held inside the clutch cover 4a by the outer peripheral portion of the diaphragm spring 4b and other parts in a conventional manner.

The pressure plate 4c moves axially when it is biased by the diaphragm spring 4b. In particular, the inner peripheral portion of the diaphragm spring 4b is moved by a release bearing (not shown) in the axial direction, i.e., the direction along the rotation axis O—O. This movement of the diaphragm spring 4b causes the pressure plate 4c to move. When the release bearing pushes the inner end of diaphragm spring 4b to the left as viewed in FIG. 1, it releases the pressure plate 4c from the biasing force of the diaphragm spring 4b. The clutch cover assembly 4 normally biases the pressure plate 4c against the flywheel 61 for holding the clutch disk assembly 5 between the flywheel 61 and the pressure plate 4c. Accordingly, the clutch cover assembly frictionally engages the flywheel assembly 60 and the clutch disk assembly with each other.

Figure 3:
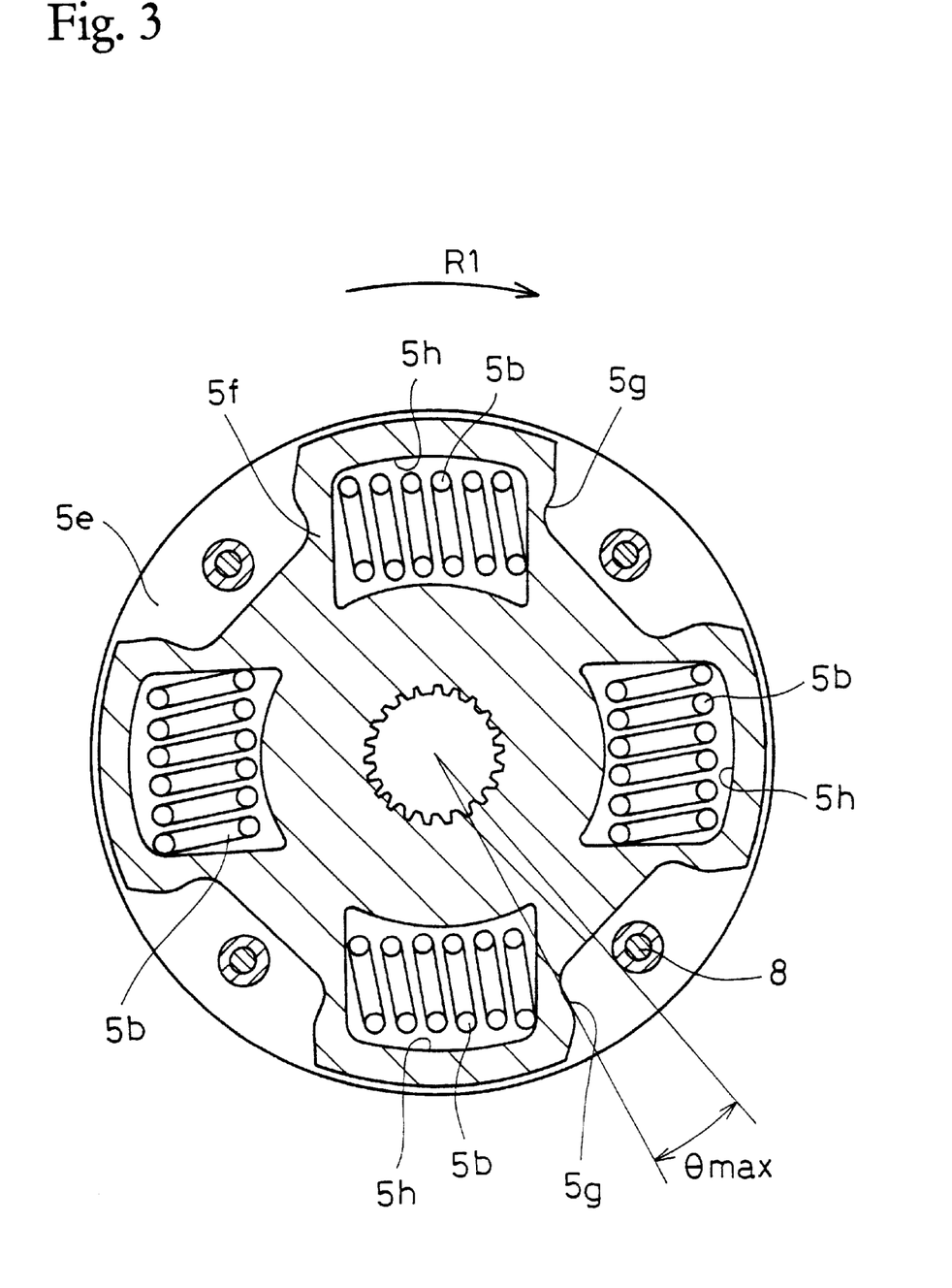
FIG. 3 is a cross-sectional view of a damper of the coupling mechanism taken along section line III of FIG. 1 in accordance with the first embodiment of the present invention.

Referring to FIGS. 1 and 3, the clutch disk assembly 5 of the main clutch 3 is basically formed of a spline hub 5c, a pair of sub-plates 5e arranged around the spline hub 5c, a plurality of coil springs 5b and cushioning plates 5d. The clutch disk assembly 5 transmits the torque between the flywheel assembly 60 and the input shaft 9 of the transmission, and functions as a damper owing to compression of the coil springs 5b and other parts.

As shown in FIG. 3, the spline hub 5c is provided at its center with a spline aperture for engagement with spline teeth of the input shaft 9 of the transmission. The spline hub 5c is integrally formed with a radially extending flange 5f, which extends outwardly from spline hub 5c.

As also shown in FIG. 3, the flange 5f is provided at its outer periphery with four recesses 5g for stop pins 8. The abutment surfaces of recesses 5g are spaced from stop pins 8 by a predetermined distance. The flange 5f is provided with windows 5h located between the neighboring recesses 5g. Each window 5h accommodates one of the coil springs 5b.

Referring again to FIG. 1, two substantially circular side plates 5e are arranged at opposite sides of the flange 5f. The side plates 5e are rotatably engaged with the spline hub 5c. The side plates 5e are integrally coupled together at their outer peripheral portions by the stop pins 8. The stop pins 8 are located within the recesses 5g of the flange 5f, respectively. The stop pins 8 and the recesses 5g form a stop mechanism for limiting relative rotational movement between spline hub 5c and side plates 5e.

Several cushioning plates 5d are fixedly coupled to the outer peripheral portion of the side plate 5e on the engine side. A pair of friction facings 5a are arranged on the opposite sides of the cushioning plates 5d. The friction facings 5a are fixedly coupled to the outer peripheral portions of the cushioning plates 5d by rivets. The friction facings 5a form a frictional engagement portion of the clutch disk assembly 5 together with the cushioning plates 5d.

The side plates 5e are likewise provided with windows corresponding to the windows 5h of the flange 5f, respectively. The coil springs 5b are arranged in the windows 5h of the flange 5f and the windows in the side plates 5e. Thus, the coil springs 5b are compressed during relative rotational movement of the side plates 5e relative to the flange 5f of the spline hub 5c.

Several friction washers 5i and/or other frictional parts are arranged between the inner peripheral portions of the flange 5f and the side plates 5e. A predetermined frictional force is generated by sliding of the friction washer 5i between the flange 5f and the side plate 5e.

When the clutch disk assembly 5 is not subjected to an external force, the side plates 5e and the flange 5f of the spline hub 5c attains the positional relationship shown in FIG. 3 in the rotating direction. In this position, the stop pins 8 keep an angular space of $\theta_{max}$ in the forward rotating direction R1 with respect to the —corresponding abutment surfaces of recesses 5g of the spline hub 5c. Thus, the damper of this clutch disk assembly 5 has a maximum allowable operation angle of $\theta_{max}$.

The inertia adding assembly 70 is basically formed of an annular mass member (mass portion) 71, a circular or annular support plate 74, a sub-clutch housing 81, a sub-clutch 73 and a circular plate 75. The mass member 71 is arranged axially! between the flywheel 61 and the housing member 62. The mass member 71 has an inertia moment of I.

The input portion of the inertia adding assembly 70 is formed of the circular support plate 74 and the sub-clutch housing 81. The support plate 74 has an annular or circular form. The input portion of the inertia adding assembly 70 is formed of the circular or annular support plate 74 and the sub-clutch housing 81, which are fixed together by rivets as shown in FIG. 1. The sub-clutch housing 81 is formed of a circular plate portion 81a, a fixing portion 81b, a cylindrical portion 81c, and an axial restriction portion 81d. The fixing portion 81b extends axially from the inner periphery of the circular portion 81a toward the transmission and then further extends radially inward toward the axis O—O. The cylindrical portion 81c extends axially from the outer periphery of the circular plate portion 81a toward the transmission. The axial restriction portion 81d extends radially inward from the end of the cylindrical portion 81a near the transmission. The cylindrical portion 81c is provided with a plurality of circumferentially spaced openings.

The inner peripheral portion of the input portion of the inertia adding assembly 70 is fixedly coupled to an outer race 7a of a ball bearing 7. Specifically, the inner peripheral portion of the circular support plate 74 and the fixing portion 81b of the sub-clutch housing 81 secure the input portion to an outer race 7a of a ball bearing 7. An inner race 7b of the ball bearing 7 is fixedly coupled to the crankshaft 90 of the engine so that the input portion is supported rotatably on the crankshaft 90 of the engine but unmovably on the crankshaft 90 of the engine in the axial and radial directions.

The input portion of the inertia adding assembly 70 is adhered at its outer peripheral portion to the inner peripheral surface of the mass portion 71. More specifically, the inner peripheral surface of the mass member 71 is fixedly coupled to the outer peripheral portion of the circular support plate 74 and the outer peripheral surface of the cylindrical portion 81c of the sub-clutch housing 81.

Figure 2:
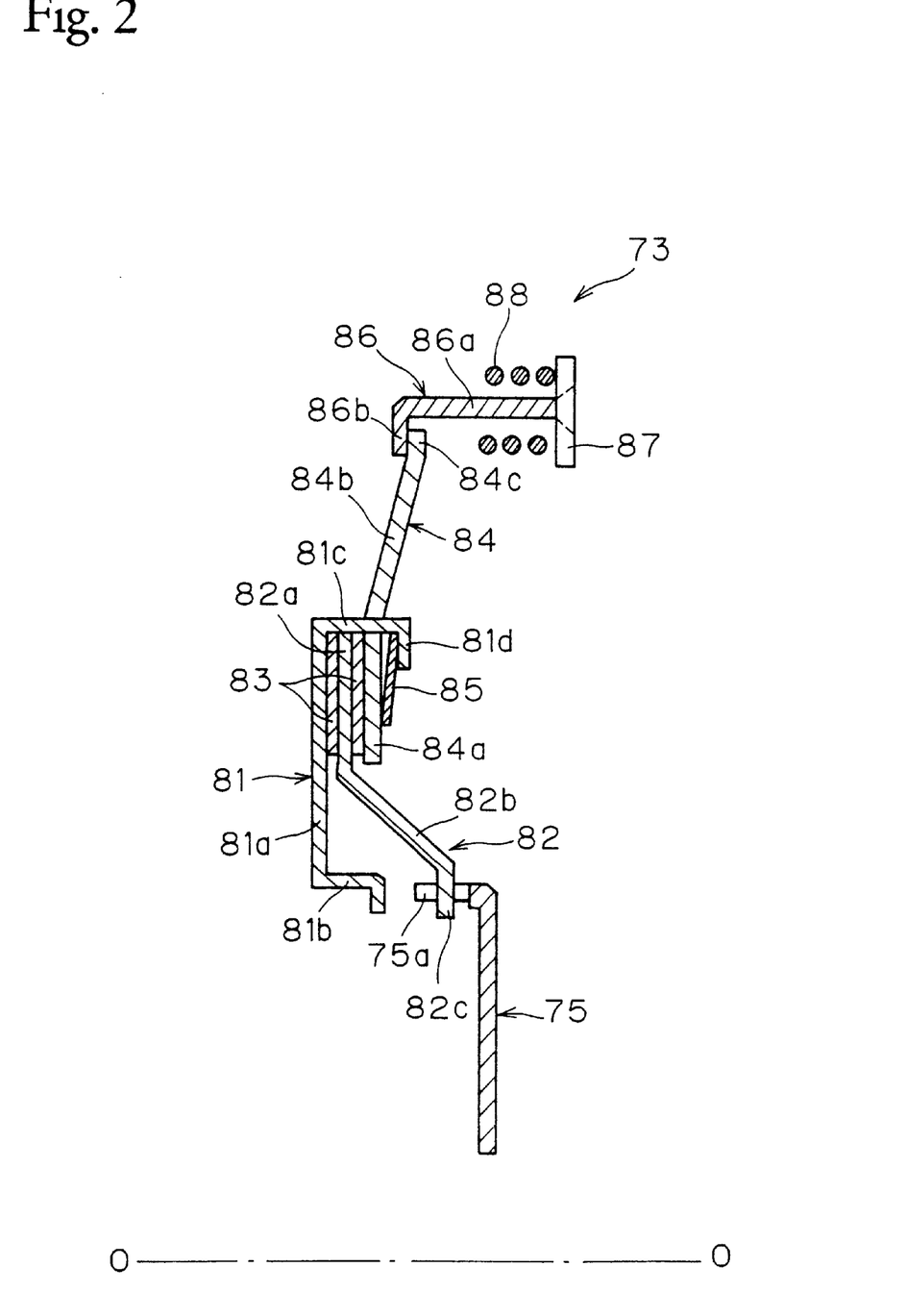
FIG. 2 is a partial cross-sectional view of a sub-clutch of the coupling mechanism in accordance with the first embodiment of the present invention.

The sub-clutch 73 is a clutch mechanism of a frictional engagement type for engaging and disengaging the input portion of the inertia adding assembly 70 with -aid from the input shaft 9 of the transmission. The sub-clutch 73 is basically formed of the sub-clutch housing 81 (discussed above), a friction plate 82, a release coupling member 84, a conical spring 85, one or more release members 86 with circular seats 87 attached thereto and one or more coil springs 88.

Turning now to FIG. 2 in particular, the friction plate 82 is formed of an outer peripheral portion 82a with a pair of annular friction members 83 located on its axially opposite surfaces, respectively, an inner peripheral portion 82b and a plurality of claws 82c. The inner peripheral portion 82b extends radially inward and obliquely from the inner periphery of the outer peripheral portion 82a toward the transmission. The claws 82c project radially inward from the inner periphery of the inner peripheral portion 82b.

The coupling member 84 is formed of a radially inner circular plate portion 84k, a plurality of intermediate levers 84b and radially outer lever portions 84c. The intermediate levers 84b extend radially outward and obliquely from the radially inner circular plate portion 84a toward the transmission. The radially outer lever portions 84c extend radially outward from the radially outer ends of the intermediate levers 84b, respectively. The radially inner circular plate portion 84a has radially inner portions, which extend through openings formed at the cylindrical portion 81c, and therefore is axially movable.

The conical spring 85 has outer peripheral portions restricted from movement toward the transmission by the axial restriction portion 81d of the sub-clutch housing 81. Conical spring 85 has an inner peripheral portion which biases the outer peripheral portion 82a of the friction plate 82 toward the input portion (i.e., the circular plate 81 a of the sub-clutch housing 81) through the radially inner circular plate portion 84a of the release coupling member 84. By adjusting or selecting the elasticity of this conical spring 85, the torque transmission capacity (T) of the sub-clutch 73 can be selected to operate in accordance with the present invention. In this embodiment, the elasticity of the conical spring 85 is selected such that the torque transmission capacity T is substantially equal to or slightly less than the torque needed to cause rotation of the damper of the clutch disk assembly 5 to the allowable maximum operation angle of $\theta_{max}$. In other words, the torque transmission capacity T is substantially equal to the torque obtained by assigning $\theta_{max}$ to $\theta_0$ in the following formula:

$$(I) \cdot (\theta_0)$$

Figure 4:
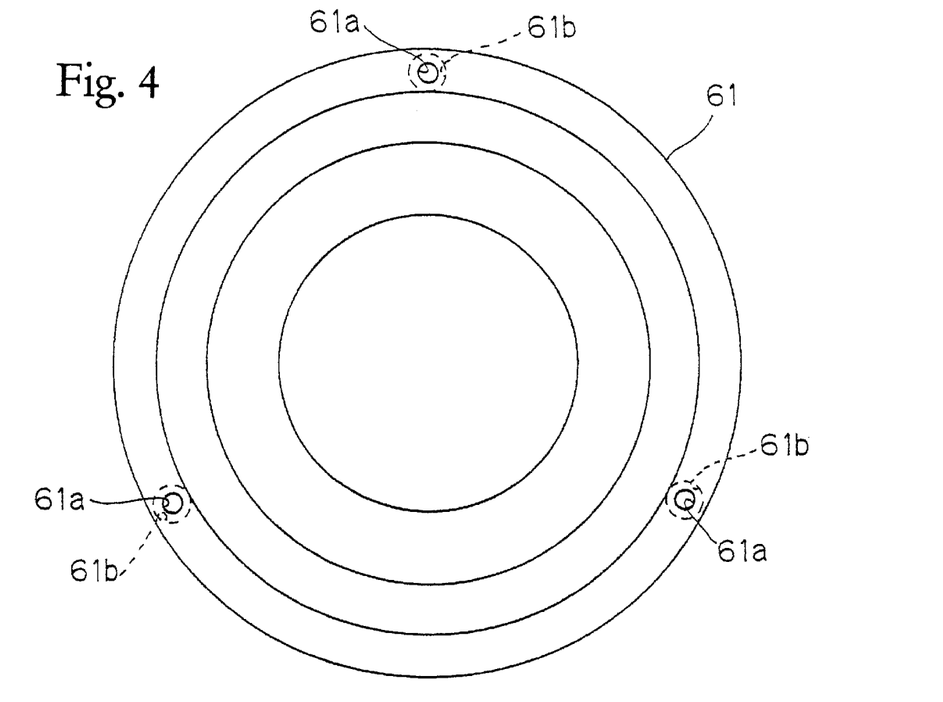
FIG. 4 is a left side elevational view of the flywheel illustrated in FIG. 1.

As seen in FIGS. 1 and 4, the release members 86 are each formed of a connecting portion 86a and an engagement portion 86b extending radially inward from the end of the connecting portion 86a near the engine. While three release members 86 are illustrated, it will be apparent to those skilled in the art that the number of release members is a matter of design choice. Thus, fewer or more release members can be used as needed and/or desired. The release members 86 extend through the holes 61 a in the flywheel 61 as seen in FIG. 1. As seen in FIG. 4, the release members 86 are substantially L-shaped members or hooks, which are circumferentially spaced apart from each other. The ends of the posts forming the connecting portions 86a near the transmission are fixedly coupled to the circular seats 87 by caulking or other means for preventing separation from the same. The surfaces of the engagement portions 86b opposed to the transmission contact the lever outer peripheral portion 84c of the coupling member 84. More specifically, the engagement portions 86b are in contact with the surface of the lever outer peripheral portion 84c, which is opposed to the engine.

Each coil spring 88 is arranged within one of the concavities 61b in the flywheel 61 for continuously pressing the circular seats 87 against the pressure plate 4c. Thereby, the circular seats 87 and the release members 86 follow the axial movement of the pressure plate 4c.

The circular plate 75 couples the input shaft 9 of the transmission and the friction plate 82 of the sub-clutch 73. The inner periphery of the circular plate 75 is fixed to the spline hub 5c, which in turn is fixed to the input shaft 9. The circular plate 75 has a plurality of claws 75a, which extend from the outer periphery thereof toward the engine (i.e., to the left as viewed in FIG. 1). The claws 75a are circumferentially engaged with claws 82c of the friction plate 82. Therefore, the friction plate 82 is non-rotatably coupled to the circular plate 75, but is axially movable with respect to the circular plate 75.

Description will now be given on operations of the coupling mechanism 91 and the inertia adding assembly 70. The rotation of the crankshaft 90 of the engine is transmitted to the input shaft 9 of the transmission through the flywheel assembly 60 and the main clutch 3. When the main clutch 3 is in the engaged position as shown in FIG. 1, the pressure plate 4c is biased toward the flywheel 61 by the biasing force of the diaphragm spring 4b so that the clutch disk assembly 5 is held between the flywheel 61 and the pressure plate 4c. Thereby, the crankshaft 90 of the engine is coupled to the input shaft 9 of the transmission. In this state, as shown in FIG. 1, the friction plate 82 is biased by the conical spring 85 toward the engine so that the sub-clutch housing 81 and the friction plate 82 are frictionally engaged. Therefore, the input shaft 9 of the transmission is coupled to the mass member 71 of the inertia adding assembly 70, and input portion through the circular plate 75 and the friction plate 82.

When the inertia adding assembly 70 is coupled to the input shaft 9 of the transmission, the inertia moment I of the mass member 71 is added to the input shaft 9 of the transmission so that the vibration system of the transmission changes to an extent avoiding the resonance. This reduces the vibration of the transmission caused by the torque variations of the engine.

In this embodiment, the mass member 71 is reliably interlocked with the input shaft 9 of the transmission when the damper of the clutch disk assembly 5 operates effectively within the allowable maximum operation angle of $\theta_{max}$. Therefore, the inertia moment I of the mass member 71 reliably changes the vibration system of the transmission to avoid the resonance with the torque variation of the transmission even in the engine speed range. If the mass member 71 were not interlocked with the input shaft 9 of the transmission, the transmission would cause the resonance with the torque variation of the engine.

When a large torque Tb is transmitted between the crankshaft 90 of the engine and the input shaft 9 of the transmission, e.g., in a starting operation, the damper of the clutch disk assembly 5 attains the maximum allowable operation angle of $\theta_{max}$. When the damper of the clutch disk assembly attains the maximum allowable operation angle of $\theta_{max}$, the stop pins 8 are engaged with the abutment surfaces of the recesses 5g, respectively, to prevent further rotation of the damper. In the clutch disk assembly 5, this torque Tb is primarily transmitted from the frictional engagement portion of the clutch disk assembly 5 to the spline hub 5c through the stop mechanism (the stop pins 8 and the recesses 5g engaged together). Since the torque Tb transmitted to the input shaft 9 of the transmission is larger than the torque transmission capacity T of the sub-clutch 73, a slip occurs between the friction member 83 of the friction plate 82 and the sub-clutch housing 81 so that the mass member 71 of the inertia adding assembly 70 is not completely interlocked with the input shaft 9 of the transmission. Thus, the maximum external force acting on the mass member 71 and the sub-clutch 73 is smaller than that in the case where the sub-clutch has a sufficiently large torque transmission capacity and the mass member is completely interlocked with the input shaft of the transmission. Therefore, the structures of the sub-clutch 73 and the mass member 71 can be reduced in weight compared with the case where the sub-clutch has a sufficiently large torque transmission capacity and the mass member is completely interlocked with the input shaft of the transmission. Also, the costs of the sub-clutch 73 and the mass member 71 can be reduced.

According to this coupling mechanism 91, the inertia adding assembly 70 is not completely interlocked with the input shaft 9 of the transmission when the stop mechanism operates and the stop pins 8 are engaged with the recesses 5g, respectively. However, during the neutral state of the transmission and the normal driving, the damper of the clutch disk assembly 5 operates with an angle not exceeding the allowable maximum operation angle of $\theta_{max}$. Therefore, noises during the neutral state of the transmission and the normal driving are suppressed.

When the biasing force of the diaphragm spring 4b is released, the frictional engagement between the clutch disk assembly 5 and the flywheel 61 is released. Thereby, the sub-clutch 73 is disengaged. Accordingly, the inertia moment I of the mass member 71 is no longer added to the input shaft 9 of the transmission so that presence of the mass member 71 hardly exerts an adverse influence on the shift operation feeling of the transmission.

When the main clutch 3 is released and the pressure plate 4c moves toward the transmission, the release members 86 move toward the transmission together with the pressure plate 4c. Thereby, the coupling member 84 moves toward the transmission against the elastic force of the conical spring 85 to decrease the torque transmission capacity achieved by the frictional engagement between the friction plate 82 and the sub-clutch housing 81. Thus, even when the main clutch 3 is in the disengaged state, the sub-clutch 73 is disengaged only incompletely so that the mass member 71, and the input portion of the inertia adding assembly 70 rotate at a speed close to the rotation speed of the input shaft 9 of the transmission.

Second Embodiment

Figure 6:
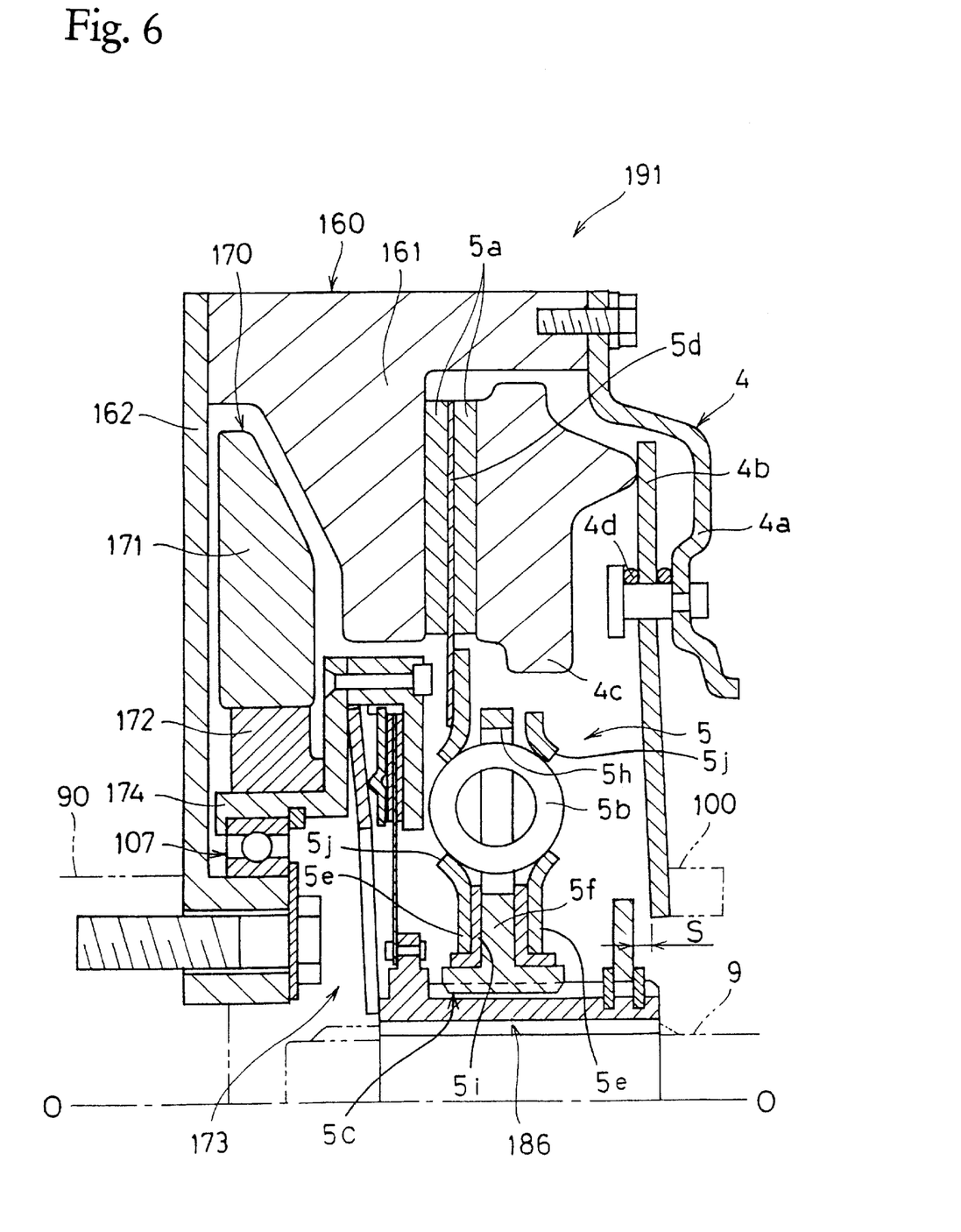
FIG. 6 is a partial cross-sectional view of a coupling mechanism in accordance with a second embodiment of the invention.
Figure 7:
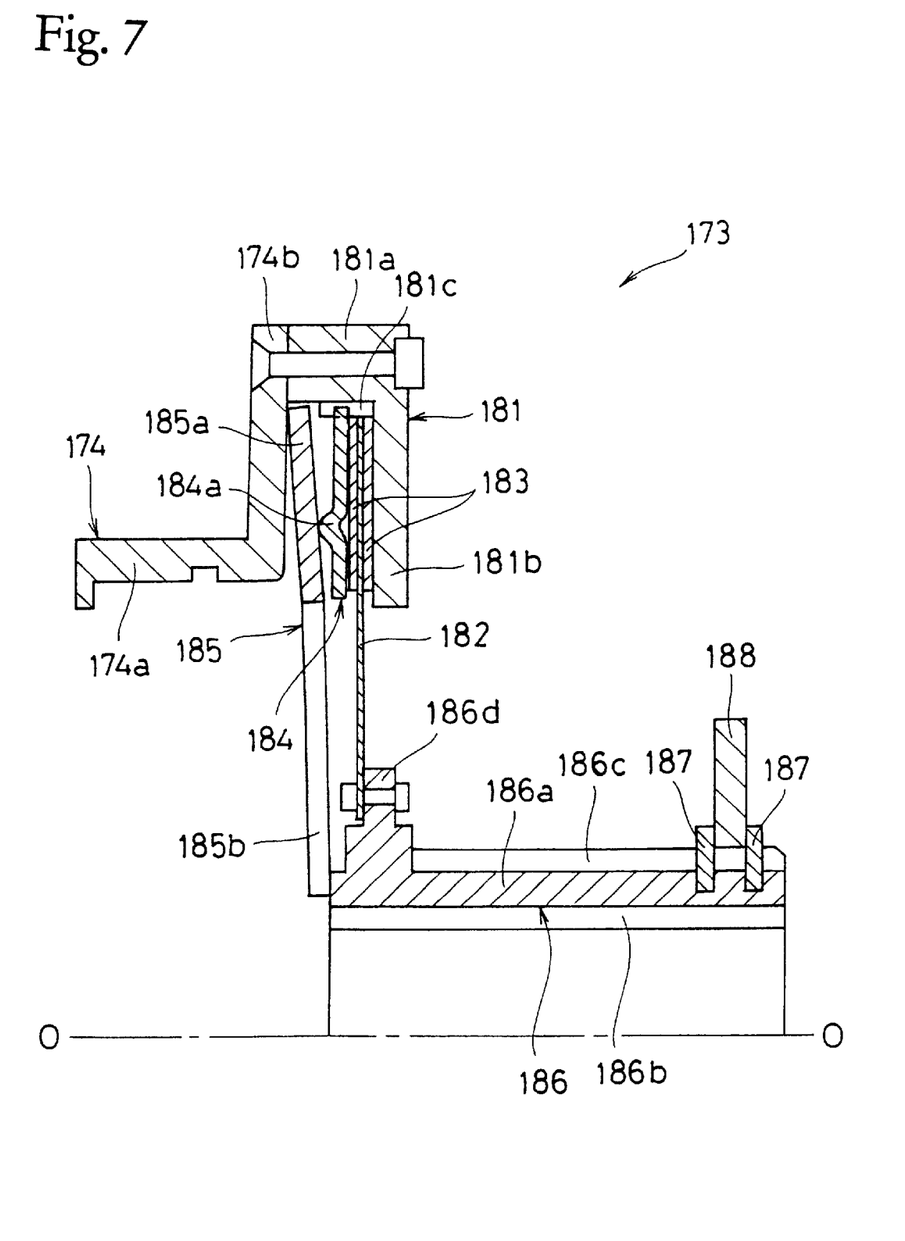
FIG. 7 is a partial cross-sectional view of a sub-clutch in accordance with a second embodiment of the present invention.

Referring now to FIGS. 6 and 7, a second embodiment of the present invention is illustrated. This second embodiment is similar to the first embodiment Thus, the second embodiment will not be shown or described in as much detail as the first embodiment. In the following description of the second embodiment of the present invention, parts and portions which are the same as or similar to those of the first embodiment will be given the same reference numbers.

Referring initially to FIG. 6, a partial cross-sectional view of a coupling mechanism 191 is illustrated which includes an inertia adding assembly or dynamic damper 170 in accordance with one embodiment of the present invention. The coupling mechanism 191 is provided for engaging and disengaging a crankshaft 90 of an engine with and from an input shaft 9 of a transmission. The coupling mechanism 191 basically includes an inertia adding assembly 170 which is connected by a sub-clutch 173 to the input shaft 9 of the transmission for dampening a vibration of the transmission.

The coupling mechanism 191 is basically formed of a flywheel assembly 160, a clutch cover assembly 4, a clutch disk assembly 5 and the inertia adding assembly 170. A rotation axis of the coupling mechanism 190 is represented by line O—O in FIG. 6.

The flywheel assembly 160 is non-rotatably coupled to the crankshaft 90 of the engine. The flywheel assembly 160 is basically formed of a flywheel 161 and an annular or circular plate member 162. The flywheel 161 and the annular plate member 162 have their outer peripheral portions fixedly connected together. The inner peripheral portion of the annular plate member 162 is fixedly coupled to the crankshaft 90 of the engine by a plurality of circumferentially equally spaced apart bolts (only one shown).

The clutch cover assembly 4 is basically formed of a clutch cover 4a, an annular diaphragm spring 4b and a pressure plate 4c which is biased toward the engine (leftward as viewed in FIG. 6) by the diaphragm spring 4b. The clutch cover assembly 4 is designed to bias the pressure plate 4c against the flywheel 161 for holding the outer peripheral portion (frictional engagement portion) of the clutch disk; assembly 5 between the flywheel 161 and the pressure plate 4c. Thereby, frictionally engaging the flywheel assembly 4 and the clutch disk assembly 5 with each other. The clutch cover 4a is fixedly coupled at its outer peripheral portion to an end of the flywheel 161 near the engine (i.e., a right end as viewed in FIG. 6). The inner peripheral portion of the clutch cover 4a carries a radially middle portion (more specifically, a relatively outer portion) of the diaphragm spring 4b via wire rings 4d.

The pressure plate 4c is held within the clutch cover 4a by the outer peripheral portion of the diaphragm spring 4b and others parts in a conventional manner. The pressure plate 4c moves axially by a release bearing 100. In particular, the release bearing 100 engages the inner periphery of the diaphragm spring 4b for moving the diaphragm spring 4b and the pressure plate 4c along the rotation axis O—O (i.e., an axial direction). Thus, this movement of the diaphragm spring 4b releases the biasing force from the pressure plate 4c for disengaging the pressure plate 4c from the fiction facings 5a. In this structure, the distance of axial movement of the release bearing 100 and of the inner periphery of the diaphragm spring 4b is shorter than the distance of movement of the pressure plate 4c and the diaphragm spring 4b (see FIG. 6).

A clutch disk assembly 5 is basically formed of a frictional engagement portion having friction facings 5a, a splined hub 5c and coil springs 5b. The coil springs 5b elastically couple the frictional engagement portion and the splined hub 5c together in the rotating direction. The inner periphery of the splined hub 5c has splines which engage the outer spline teeth 186c of a release member 186, which in turn has interval splines that engage the splines of the input shaft 9 of the transmission as will be described later.

Similar to the first embodiment, the spline hub 5c is integrally provided with the radially outward flange 5f. The flange 5f is provided at its outer periphery with the four recesses for the stop pins. The flange 5f is also provided with the windows 5h located between the neighboring recesses. Each window 5h accommodates one of the coil springs 5b. The abutment surfaces of recesses are spaced from the stop pins by a predetermined distance similar to the first embodiment.

The two substantially circular side plates 5e are arranged at opposite sides of the flange 5f. The side plates 5e are rotatably engaged with the spline hub 5c. The side plates 5e are integrally coupled together at their outer peripheral portions by stop pins. The stop pins are located within the recesses of the flange 5f The stop pins and the recesses form a stop mechanism for limiting relative rotational movement between spline hub 5c and side plates 5e.

Several cushioning plates 5d are fixedly coupled to the outer peripheral portion of the side plate 5e on the engine side. The pair of friction facings 5a are arranged on the opposite sides of the cushioning plates 5d. The friction facings 5a are fixedly coupled to the outer peripheral portions of the cushioning plates 5d by rivets;, and form a frictional engagement portion together with the cushioning plates 5d.

The side plates 5e are likewise provided with windows 5j corresponding to the windows 5h of the flange 5f, respectively. The coil springs 5b are arranged in the windows 5h of the flange 5f and the windows 5j in the side plates 5e.

The friction washers 5i and/or other parts are arranged between the inner peripheral portions of the flange 5f and the side plates 5e. A predetermined frictional force is generated by sliding of the friction washers 5i between the flange 5f and the side plate 5e.

Similar to the first embodiment, the damper of the clutch disk assembly 5 of this second embodiment has the allowable maximum operation angle of $\theta_{max}$. The damper of the clutch disk assembly 5 is prevented from attaining a larger operation angle by the engagement of the recesses of the flange 5f of the spline hub 5c with the stop pins. In other words, the stop pins keep an angular space of $\theta_{max}$ in the forward rotation direction with respect to the corresponding abutment surfaces of the recesses of the flanges 5f.

The inertia adding assembly 170 is basically formed of an annular mass member (mass portion) 171, an annular rubber member (elastic portion) 172, a support member 174 and a sub-clutch 173. The mass member 171 is disposed between the flywheel 161 and the annular plate member 162. The mass member 171 has an inertia moment of I. The annular rubber member 172 elastically couples the mass member 171 to the support member 174 in the circumferential, axial and radial directions.

As shown in FIG. 7, the support member 174 is formed of a cylindrical portion 174a and an annular or circular plate portion 174b extending radially outward from the end of the cylindrical portion 174a nearest to the transmission. The inner peripheral surface of the cylindrical portion 174a is fixedly coupled to an outer race of a ball bearing 107. The inner race of the ball bearing 107 is fixedly coupled to the inner peripheral portion of the annular plate member 162 of the flywheel assembly 160. Therefore, the support member 174 is rotatably carried by the flywheel assembly 160 but is unmovably coupled to the flywheel assembly 160 in the radial and axial directions by the ball bearing 107. The outer peripheral surface of the cylindrical portion 174a and a portion of the surface of the annular plate portion 174b opposed to the engine are fixedly coupled to the inner peripheral portion of the annular rubber member 172 in a conventional manner.

Still referring to FIG. 6, the sub-clutch 173 is a mechanism for engaging and disengaging the above three components (i.e., mass member 171, annular rubber member 172 and support member 174) with and from the input shaft 9 of the transmission. The sub-clutch 173 is of a frictional engagement type clutch. As shown in FIGS. 6 and 7, the sub-clutch 173 is basically formed of the foregoing support member 174 as well as a sub-clutch housing 181 (a first part), a friction plate 182 (a second part), an indirect member 184, a small diaphragm spring 185, a cylindrical release member 186, retainer members 187 and a transmission member 188.

The sub-clutch housing 181 is formed of a cylindrical portion 181a and a frictional engagement portion 181b which extends radially inward from the end of the cylindrical portion 181a near the transmission (i.e., right end as viewed in FIG. 7). The surface of the cylindrical portion 181a facing the engine (i.e., left side as viewed in FIG. 7) is in contact with the outer peripheral portion of the annular plate member 174b of the support member 174. Preferably, the cylindrical portion 181a of the sub-clutch housing 181 is fixedly coupled to the annular plate member 174b by rivets. The cylindrical portion 181a is provided at its inner peripheral surface with engagement portions 181c, which project radially inwardly to engage the indirect member 184 as discussed below.

The friction plate 182 includes a thin annular plate with friction members 183 which fixedly coupled the axially opposite facing surfaces of its outer peripheral portion. The friction plate 182 is fixed at its inner peripheral portion to the release member 186. The outer peripheral portion of the friction plate 182 is located on the engine side with respect to the frictional engagement portion 181b of the sub-clutch housing 181. More specifically, the friction plate 182 is located between the frictional engagement portion 181b of the sub-clutch housing 181 and the support member 174. The friction plate 182 is normally biased against the frictional engagement portion 181b by the diaphragm spring 185, which presses the indirect member 184 against the friction plate 182.

The indirect member 184 is an annular plate which is provided at its radially middle portion with an annular projection 184a projecting toward the engine. The indirect member 184 has its outer peripheral portion partially engaged with the engagement portion 181c of the sub-clutch housing 181. Therefore, indirect member 184 is axially movable with respect to the sub-clutch housing 181, but is circumferentially non-rotatable with respect to the sub-clutch housing 181. This arrangement suppressing rattling within the sub-clutch housing 181. This indirect member 184 is disposed on the engine side with respect to the outer peripheral portion of the friction plate 182.

The small diaphragm spring 185 is formed of a radially outer biasing portion 185a having an annular and conical form and a plurality of release levers 185b extending radially inward from the radially outer biasing portion 185a The radially outer biasing portion 185a is disposed on the engine side with respect to the indirect member 184. The annular plate portion 174b of the support member 174 prohibits the movement of the outer periphery of the radially outer biasing portion 185a toward the engine. Thus, the radially outer biasing portion 185a pushes the outer peripheral portion of the friction plate 182 against the frictional engagement portion 181b of the sub-clutch housing 181 through the projection 184a of the indirect member 184. The inner peripheral portion of the release levers 185b are in contact with the end surface of a cylindrical main portion 186a of the release member 186 which is opposed to the engine.

By adjusting or selecting the elasticity of this small diaphragm spring 185, the torque transmission capacity T of the sub-clutch 173 can be appropriately selected to operate in accordance with the present invention. In this second embodiment, the elasticity of the small diaphragm spring 185 is selected such that the torque transmission capacity T is preferably substantially equal to or slightly less than the torque needed to cause rotation of the damper of the clutch disk assembly 5 to the maximum allowable operation angle of $\theta_{max}$. In other words, the torque transmission capacity T is preferably substantially equal to the torque obtained by assigning $\theta_{max}$ to $\theta_0$ in the following formula:

$$(I) \cdot (\theta_0)$$

As shown in FIG. 7, the release member 186 is formed of the cylindrical maia portion 186a, which has inner spline teeth 186b formed at the inner peripheral surface of the cylindrical main portion 186a, outer spline teeth 186c formed at the outer peripheral surface of the cylindrical main portion 186a and a fixing portion 186d extending radially outward from a portion of the cylindrical main portion 186a near the engine. The cylindrical main portion 186a is disposed radially between the splined hub 5c and the input shaft 9 of the transmission. The inner spline teeth 186b of the cylindrical main portion 186a are non-rotatably engaged with the outer spline teeth of the input shaft 9 of the transmission. The splined hub 5c is non-rotatably supported on the cylindrical main portion 186b by the outer spline teeth 186b engaging the spline teeth of the splined hub 5c. Thus, the release member 186 is axially movable and circumferentially non-rotatable with respect to the input shaft 9 of the transmission and the splined hub 5c. The inner peripheral portion of the friction plate 182 is fixed to the outer peripheral portion of the fixing portion 186d by a plurality of rivets or the like. A portion of the cylindrical main portion 186a near the transmission carries the annular transmission member 188 fixedly coupled thereto by the retainer members 187.

The transmission member 188 is operable to come into contact with the inner peripheral portion of the diaphragm spring 4b to transmit a moving force from the release bearing 100 toward the engine to the release member 186 when the release bearing 100 and the inner peripheral portion of the diaphragm spring 4b move toward the engine. A space S having an axial length of S is normally kept between the transmission member 188 and the inner peripheral portion of the diaphragm spring 4b such that the diaphragm spring 185 normally holds the friction plate 182 against the frictional engagement portion 181b of the sub-clutch housing 181.

Now, the operation of the coupling mechanism 191 and its inertia adding assembly 170 will now be described below. Rotation of the crankshaft 90 of the engine is transmitted to the input shaft 9 of the transmission through the flywheel assembly 160, clutch cover assembly 4 and clutch disk assembly 5 in a relatively conventional manner.

Figure 5:
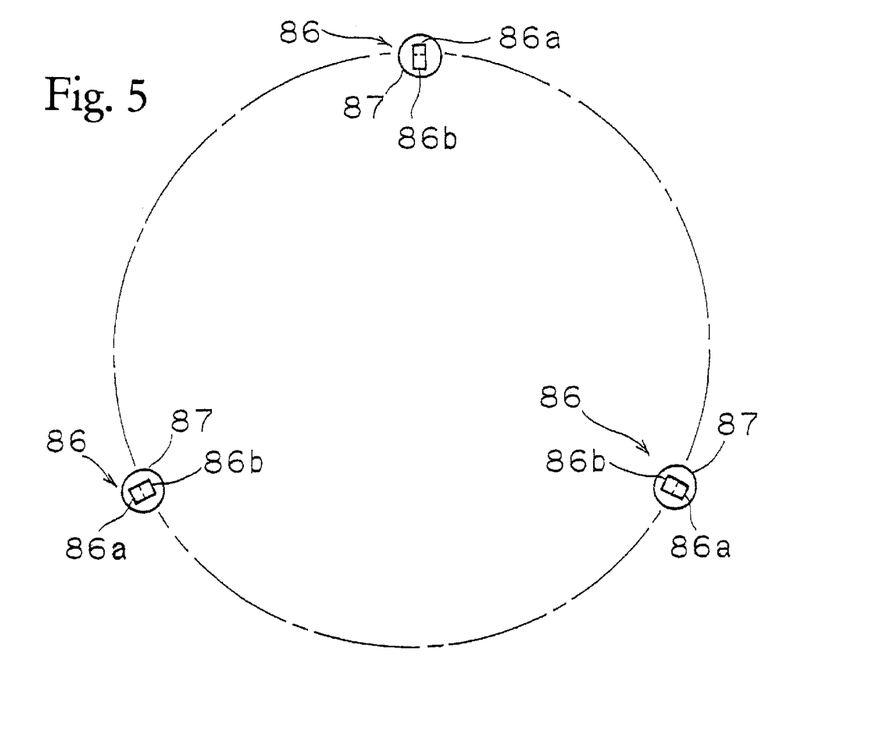
FIG. 5 is a left side elevational view of the three release members arranged in a circular pattern for use in the flywheel assembly illustrated in FIGS. 1 and 2.

When the coupling mechanism 191 is in the engaged state shown in FIG. 5, ite diaphragm spring 4b biases the pressure plate 4c toward the flywheel 161, and the frictional engagement portion of the clutch disk assembly 5 is held between the flywheel 161 and the pressure plate 4c. Thereby, the crankshaft 90 of the engine is coupled to the input shaft 9 of the transmission. In this engaged state, as best shown in FIG. 6, the small diaphragm spring 185 also biases the outer peripheral portion of the friction plate 182 toward the transmission, such that the sub-clutch housing 181 and the friction plate 182 are frictionally engaged. Therefore, the input shaft 9 of the transmission is operatively coupled to the mass portion 171, annular rubber member 172 and support member 174 of the inertia adding assembly 170 through the release member 186, friction plate 182 and sub-clutch housing 181.

When the inertia adding assembly 170 is operatively coupled to the input shaft 9 of the transmission, the inertia adding assembly 170 dampens neutral noises of the transmission and noises during driving. In particular, the inertia adding assembly or dynamic damper 170 actively dampens the vibration of the transmission in a partial rotation speed range. Moreover, similar to the first embodiment, when the mass member 171 is coupled to the input shaft 9 of the transmission, the inertia moment I of the mass member 71 is added to the input shaft 9 of the transmission so that the vibration system of the transmission changes to an extent to avoid the resonance. This farther reduces the vibration of the transmission caused by the torque variations of the engine.

In this embodiment, the inertia adding assembly 170 is reliably interlocked with the input shaft 9 of the transmission when the damper of the clutch disk assembly operates effectively within the allowable maximum operation angle of O.

When a large torque Tb is transmitted between the crankshaft 90 of the engine and the input shaft 9 of the transmission, e.g., in a starting operation, the damper of the clutch disk assembly 5 attains the maximum allowable operation angle of $\theta_{max}$, and thus, the stop mechanism operates to prevent further rotation of the damper of the clutch disk assembly 5. In the clutch disk assembly 5, this torque Tb is primarily transmitted from the frictional engagement portion of the clutch disk assembly 5 to the spline hub 5c through the stop mechanism. Since the torque Tb transmitted to the input shaft 9 of the transmission is larger than the torque transmission capacity T of the sub-clutch 173, a slip occurs between the friction member 183 of the friction plate 182 and the sub-clutch housing 181 so that the inertia adding assembly 170 is not completely interlocked with the input shaft 9 of the transmission. Thus, the maximum external force acting on the annular rubber member 172 and the sub-clutch 173 is smaller than that in the case where the sub-clutch has a sufficiently large torque transmission capacity and the inertia adding assembly is completely interlocked with the input shaft of the transmission. Therefore, the structures of the inertia adding assembly 170 can be reduced in weight compared with the case where the sub-clutch has a sufficiently large torque transmission capacity and the inertia adding assembly is completely interlocked with the input shaft of the transmission. Also, the cost of the inertia adding assembly 170 can be reduced.

According to this coupling mechanism 191, the inertia adding assembly 170 is not completely interlocked with the input shaft 9 of the transmission when the stop mechanism operates and the stop pins 8 are engaged with the recesses 5g, respectively. However, during the neutral state of the transmission and the normal driving, the damper of the clutch disk assembly 5 operates with an angle not exceeding the allowable maximum operation angle of $\theta_{max}$. Therefore, a majority of noises during the neutral state of the transmission and the normal driving are suppressed.

When the coupling mechanism 191 is to be released, the release bearing 100 is moved toward the engine from the position shown in FIG. 6 in a conventional manner. When the release bearing 100 starts to move toward the engine, the outer peripheral portion of the diaphragm spring 4b moves toward the transmission so that the pressure plate 4c is released and moves toward the transmission. Thereby, the frictional engagement portion of the clutch disk assembly 5 is first released from the flywheel 161 and the pressure plate 4c, and the crankshaft 90 of the engine is uncoupled from the input shaft 9 of the transmission.

As the release bearing 100 moves toward the engine, the space S disappears so that the release bearing 100 pushes against the transmission member 188 to move the release member 186 toward the engine. This pushing force moves the release member 186 toward the engine such that the inner peripheral portion of the small diaphragm spring 185 and the friction plate 182 also move toward the engine. This movement decreases the biasing force applied by the small diaphragm spring 185 against the friction plate 182. Thus, the frictional engagement between the friction plate 182 and the sub-clutch housing 181 is released. Thereby, the mass member 171 and the annular rubber member 172 of the inertia adding assembly 170 no longer rotates together with the input shaft 9 of the transmission so that the inertia of the input shaft 9 of the transmission decreases. In the disengaged state of the coupling mechanism 191, a shifting operation of the transmission can be performed smoothly.

According to the present invention, the sub-clutch has the limited torque transmission capacity. Therefore, the maximum external force acting on the mass portion of the inertia adding assembly and the sub-clutch is small so that the structures of the sub-clutch and the mass portion can be reduced in weight and cost.

For releasing the interlocked operation of the inertia adding assembly, the structure of the present invention is provided with the release member being directly coupled to the release bearing or the inner peripheral portion of the pressure plate for axial movement. The distance of movement of the release bearing and the inner peripheral portion of the pressure plate is larger than the distance in which the prior art clutch disk assembly moves a release member to release the sub-clutch in the prior art Therefore, engagement and disengagement of the sub-clutch of the present invention can be performed more stably than the prior art.

While only two embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A coupling mechanism for coupling a crankshaft of an engine and an input shaft of a transmission, comprising:

a flywheel assembly configured to be non-rotatably coupled to the crankshaft of the engine;

a clutch disk assembly having a frictional engagement portion, a coupling portion configured to be coupled to the input shaft of the transmission and a damper arranged between said frictional engagement portion and said coupling portion for dampening a torque variation of the engine, said damper having an allowable maximum operation angle of ($\theta_{max}$);

a clutch cover assembly fixedly coupled to said flywheel assembly for pressing said frictional engagement portion of said clutch disk assembly toward said flywheel assembly and thereby frictionally engaging said flywheel assembly with said frictional engagement portion of said clutch disk assembly; and an inertia adding assembly having a mass portion configured to be operatively coupled to rotate in accordance with rotation of the input shaft of the transmission, and a sub-clutch configured to be operatively coupled between said mass portion and the input shaft of the transmission to release an interlocked relationship between the input shaft of the transmission and said mass portion when said flywheel assembly and said frictional engagement portion of said clutch disk assembly are disengaged from each other, said sub-clutch having a torque transmission capacity (T) smaller than a torque transmitted between the frictional engagement portion of said clutch disk assembly and said coupling portion of said clutch disk assembly when said damper of said clutch disk assembly attains said angle of ($\theta_{max}$) so that said inertia adding assembly is not completely interlocked with the input shaft of said transmission upon said damper of said clutch disk assembly attaining said angle of ($\theta_{max}$), but said torque transmission capacity (T) of said sub-clutch reliably interlocks said inertia adding assembly with the input shaft of said transmission when said damper of said clutch assembly operates within said angle of ($\theta_{max}$).

2. The coupling mechanism according to claim 1, wherein said sub-clutch has a first part coupled to said mass portion, a second part adapted to be non-rotatably coupled to the input shaft of the transmission and a release member arranged to contact a pressure plate and move in response to axial movement of said pressure plate, said release member of said sub-clutch being operable to at least partially disengage said second part from said first part when biasing by said pressure plate disengages the flywheel to release the crankshaft of the engine from the input shaft of the transmission.

3. The coupling mechanism according to claim 2, wherein said release member is adapted to extend through an axial through hole formed in a flywheel of said flywheel assembly, and said inertia adding assembly is configured to be opposed to said pressure plate with said flywheel therebetween.

4. The coupling mechanism according to claim 2, wherein said sub-clutch has a plurality of said release members with each of said release members including an engagement portion, a connecting portion extending through a hole formed in a flywheel of said flywheel assembly, and a seat portion for engaging a pressure plate.

5. The coupling mechanism according to claim 2, wherein said mass portion and said first part of said sub-clutch are coupled to a bearing which is adapted to be coupled to the crankshaft of the engine to rotatably support said mass portion and said first part of sub-clutch on the crankshaft of the engine.

6. The coupling mechanism according to claim 2, wherein said sub-clutch farther includes a coupling member disposed between said first part and said second part, said coupling member is coupled to said release member to move therewith.

7. The coupling mechanism according to claim 1, wherein said inertia adding assembly further comprising an elastic portion elastically coupling the input shaft of the transmission and said mass portion in the rotating direction when said sub-clutch interlocks the input shaft of the transmission with said mass portion.

8. The coupling mechanism according to claim 7, wherein said sub-clutch has a first part coupled to said mass portion, a second part configured to be coupled to the input shaft of the transmission and a release member adapted to be coupled to the input shaft of the transmission to axially move in response to axial movement of a release bearing.

9. A coupling mechanism for coupling a crankshaft of an engine and an input shaft of a transmission, comprising:

a flywheel assembly configured to be non-rotatably coupled to the crank-shaft of the engine;

a clutch disk assembly having a frictional engagement portion, a coupling portion configured to be coupled to the input shaft of the transmission and a damper arranged between said frictional engagement portion and said coupling portion for dampening a torque variation of the engine, said damper having an allowable maximum operation angle of ($\theta_{max}$);

a clutch cover assembly fixedly coupled to said flywheel assembly for pressing said frictional engagement portion of said clutch disk assembly toward said flywheel assembly and thereby frictionally engaging said flywheel assembly with said frictional engagement portion of said clutch disk assembly; and an inertia adding assembly having a mass portion configured to be operatively coupled to rotate in accordance with rotation of the input shaft of the transmission and a sub-clutch configured to be operatively coupled between said mass portion and the input shaft of the transmission to release an interlocked relationship between the input shaft of the transmission and said mass portion when said flywheel assembly and said frictional engagement portion of said clutch disk assembly are disengaged from each other, said sub-clutch having a torque transmission capacity (T) smaller than a torque transmitted between the frictional engagement portion of said clutch disk assembly and said coupling portion of said clutch disk assembly when said damper of said clutch disk assembly attains said angle of ($\theta_{max}$);

said torque transmission capacity (T) of said sub-clutch being substantially equal to or smaller than a value expressed by the following formula:

$$(I) \cdot (\theta_0)$$

where I represents an inertia moment of said mass portion of said inertia adding assembly around a rotation axis and $\theta_0$ represents an operation angle $\theta_0$ of said damper caused by the torque variation of the engine.

10. The coupling mechanism according to claim 9, wherein said inertia adding assembly further comprising an elastic portion elastically coupling the input shaft of the transmission and said mass portion in the rotating direction when said sub-clutch interlocks the input shaft of the transmission with said mass portion.

11. A coupling mechanism for coupling a crankshaft of an engine and an input shaft of a transmission, comprising:

a flywheel assembly configured to be non-rotatably coupled to the crankshaft of the engine;

a clutch disk assembly having a frictional engagement portion, a coupling portion configured to be coupled to the input shaft of the transmission and a damper arranged between said frictional engagement portion and said coupling portion for dampening a torque variation of the engine, said damper having an allowable maximum operation angle of ($\theta_{max}$);

a clutch cover assembly fixedly coupled to said flywheel assembly for pressing said frictional engagement portion of said clutch disk assembly toward said flywheel assembly and thereby frictionally engaging said flywheel assembly with said frictional engagement portion of said clutch disk assembly; and an inertia adding assembly having a mass portion configured to be operatively coupled to rotate in accordance with rotation of the input shaft of the transmission, and a sub-clutch configured to be operatively coupled between said mass portion and the input shaft of the transmission to release an interlocked relationship between the input shaft of the transmission and said mass portion when said flywheel assembly and said frictional engagement portion of said clutch disk assembly are disengaged from each other, said sub-clutch having a torque transmission capacity (T) smaller than a torque transmitted between the frictional engagement portion of said clutch disk assembly and said coupling portion of said clutch disk assembly when said damper of said clutch disk assembly attains said angle of ($\theta_{max}$), said sub-clutch having a first part coupled to said mass portion, a second part adapted to be non-rotatably coupled to the input shaft of the transmission and a release member arranged to contact a pressure plate and move in response to axial movement of said pressure plate, said release member of said sub-clutch being operable to at least partially disengage said second pail from said first part when biasing by said pressure plate disengages the flywheel to release the crankshaft of the engine from the input shaft of the transmission, said sub-clutch having a plurality of said release members with each of said release members including an engagement portion, a connecting portion extending through a hole formed in a flywheel of said flywheel assembly, and a seat portion for engaging a pressure plat, said sub-clutch further including a coupling member movably coupled to said engagement portions from an engaged position to a disengaged position.

12. The coupling mechanism according to claim 11, wherein said first part of said sub-clutch includes a sub-clutch housing and said second part of said sub-clutch includes a friction plate biased by a biasing member to be operatively coupled with a portion of said sub-clutch housing.

13. The coupling mechanism according to claim 12, wherein said coupling member is disposed between said friction plate and said biasing member.

14. The coupling mechanism according to claim 13, wherein said friction plate has an inner attachment portion configured to be non-rotatably coupled to the input shaft of the transmission, but axially movable relative to the input shaft of the transmission.

15. The coupling mechanism according to claim 14, wherein said mass portion and said first part of said sub-clutch are coupled to a bearing which is adapted to be coupled to the crankshaft of the engine to rotatably support said mass portion and said first part of sub-clutch on the crankshaft of the engine.

16. A coupling mechanism for coupling a crankshaft of an engine and an input shaft of a transmission, comprising:

a flywheel assembly configured to be non-rotatably coupled to the crankshaft of the engine;

a clutch disk assembly having, a frictional engagement portion, a coupling portion configured to be coupled to the input shaft of the transmission and a damper arranged between said frictional engagement portion and said coupling portion for dampening a torque variation of the engine, said damper having an allowable maximum operation angle of ($\theta_{max}$);

a clutch cover assembly fixedly coupled to said flywheel assembly for pressing said frictional engagement portion of said clutch disk assembly toward said flywheel assembly and thereby frictionally engaging said flywheel assembly with said frictional engagement portion of said clutch disk assembly; and an inertia adding assembly having a mass portion configured to be operatively coupled to rotate in accordance with rotation of the input shaft of the transmission, and a sub-clutch configured to be operatively coupled between said mass portion and the input shaft of the transmission to release an interlocked relationship between the input shaft of the transmission and said mass portion when said flywheel assembly and said frictional engagement portion of said clutch disk assembly are disengaged from each other, said sub-clutch having a torque transmission capacity (T) smaller than a torque transmitted between the frictional engagement portion of said clutch disk assembly and said coupling portion of said clutch disk assembly when said damper of said clutch disk assembly attains said angle of ($\theta_{max}$), said sub-clutch having a first part coupled to said mass portion, a second part adapted to be non-rotatably coupled to the input shaft of the transmission and a release member arranged to contact a pressure plate and move in response to axial movement of said pressure plate, said release member of said sub-clutch being operable to at least partially disengage said second part from said first part when biasing by said pressure plate disengages the flywheel to release the crankshaft of the engine from the input shaft of the transmission, said sub-clutch further including a coupling member disposed between said first part and said second part, said coupling member being, coupled to said release member to move therewith, said first part of said sub-clutch including a sub-clutch housing and said second part of said sub-clutch includes a friction plate biased by a biasing member to be operatively coupled with a portion of said sub-clutch housing.

17. A coupling mechanism for coupling a crankshaft of an engine and an input shaft of a transmission, comprising:

a flywheel assembly configured to be non-rotatably coupled to the crankshaft of the engine;

a clutch disk assembly having a frictional engagement portion, a coupling portion configured to be coupled to the input shaft of the transmission and a damper arranged between said frictional engagement portion and said coupling portion for dampening a torque variation of the engine, said damper having an allowable maximum operation angle of ($\theta_{max}$);

a clutch cover assembly fixedly coupled to said flywheel assembly for pressing said frictional engagement portion of said clutch disk assembly toward said flywheel assembly and thereby frictionally engaging said flywheel assembly with said frictional engagement portion of said clutch disk assembly; and an inertia adding assembly having a mass portion configured to be operatively coupled to rotate in accordance with rotation of the input shaft of the transmission, a sub-clutch configured to be operatively coupled between said mass portion and the input shaft of the transmission to release an interlocked relationship between the input shaft of the transmission and said mass portion when said flywheel assembly and said frictional engagement portion of said clutch disk assembly are disengaged from each other, and an elastic portion elastically coupling the input shaft of the transmission and said mass portion in the rotating direction when said sub-clutch interlocks the input shaft of the transmission with said mass portion, said sub-clutch having a torque transmission capacity (T) smaller than a torque transmitted between the frictional engagement portion of said clutch disk assembly and the coupling portion of said clutch disk assembly when the damper of said clutch disk assembly attains said angle of ($\theta_{max}$), said sub-clutch having a first part coupled to said mass portion, a second part configured to be coupled to the input shaft of the transmission and a release member adapted to be coupled to the input shaft of the transmission to axially move in response to axial movement of a release bearing, said release member disposed between the input shaft of the transmission and said clutch disk assembly, and has an inner peripheral portion non-rotatably engaged with an outer peripheral portion of the input shaft of the transmission and an outer peripheral portion non-rotatably engaged with an inner peripheral portion of said clutch disk assembly.

18. A coupling mechanism for coupling a crankshaft of an engine and an input shaft of a transmission, comprising:

a flywheel assembly configured to be non-rotatably coupled to the crankshaft of the engine;

a clutch disk assembly having a frictional engagement portion, a coupling portion configured to be coupled to the input shaft of the transmission and a damper arranged between said frictional engagement portion and said coupling portion for dampening a torque variation of the engine, said damper having an allowable maximum operation angle of ($\theta_{max}$);

a clutch cover assembly fixedly coupled to said flywheel assembly for pressing said frictional engagement portion of said clutch disk assembly toward said flywheel assembly and thereby frictionally engaging said flywheel assembly with said frictional engagement portion of said clutch disk assembly; and an inertia adding assembly having a m ass portion configured to be operatively coupled to rotate in accordance with rotation of the input shaft of the transmission, a sub-clutch configured to be operatively coupled between said mass portion and the input shaft of the transmission to release an interlocked relationship between the input shaft of the transmission and said mass portion when said flywheel assembly and said frictional engagement portion of said clutch disk assembly are disengaged from each other, and an elastic portion elastically coupling the input shaft of the transmission and said mass portion in the rotating direction when said sub-clutch interlocks the input shaft of the transmission with said mass portion, said sub-clutch having a torque transmission capacity (T) smaller than a torque transmitted between the frictional engagement portion of said clutch disk assembly and the coupling portion of said clutch disk assembly when the damper of said clutch disk assembly attains said angle of ($\theta_{max}$), said sub-clutch having a first part coupled to said mass portion, a second part configured to be coupled to the input shaft of the transmission and a release member adapted to be coupled to the input shaft of the transmission to axially move in response to axial movement of a release bearing, said release member having a splined bore such that said release member is adapted to be movably mounted on the input shaft of the transmission in an axial direction.

19. A coupling mechanism for coupling a crankshaft of an engine and an input shaft of a transmission, comprising:

a flywheel assembly configured to be non-rotatably coupled to the crankshaft of the engine;

a clutch disk assembly having a frictional engagement portion, a coupling portion configured to be coupled to the input shaft of the transmission and a damper arranged between said frictional engagement portion and said coupling portion for dampening a torque variation of the engine, said damper having an allowable maximum operation angle of ($\theta_{max}$);

a clutch cover assembly fixedly coupled to said flywheel assembly for pressing said frictional engagement portion of said clutch disk assembly toward said flywheel assembly and thereby frictionally engaging said flywheel assembly with said frictional engagement portion of said clutch disk assembly; and an inertia adding assembly having a mass portion configured to be operatively coupled to rotate in accordance with rotation of the input shaft of the transmission, a sub-clutch configured to be operatively coupled between said mass portion and the input shaft of the transmission to release an interlocked relationship between the input shaft of the transmission and said mass portion when said flywheel assembly and said frictional engagement portion of said clutch disk assembly are disengaged from each other, and an elastic portion elastically coupling the input shaft of the transmission and said mass portion in the rotating direction when said sub-clutch interlocks the input shaft of the transmission with said mass portion, said sub-clutch having a torque transmission capacity (T) smaller than a torque transmitted between the frictional engagement portion of said clutch disk assembly and the coupling portion of said clutch disk assembly when the damper of said clutch disk assembly attains said angle of ($\theta_{max}$), said sub-clutch having a first part coupled to said mass portion, a second part configured to be coupled to the input shaft of the transmission and a release member adapted to be coupled to the input shaft of the transmission to axially move in response to axial movement of a release bearing, said release member having a splined outer peripheral portion that is adapted to movably receive said clutch disk assembly.

20. A coupling mechanism for: coupling a crankshaft of an engine and an input shaft of a transmission, comprising:

a flywheel assembly configured to be non-rotatably coupled to the crankshaft of the engine;

a clutch disk assembly having a frictional engagement portion, a coupling portion configured to be coupled to the input shaft of the transmission and a damper arranged between said frictional engagement portion and said coupling portion for dampening a torque variation of the engine, said damper having an allowable maximum operation angle of ($\theta_{max}$);

a clutch cover assembly fixedly coupled to said flywheel assembly for pressing said frictional engagement portion of said clutch disk assembly toward said flywheel assembly and thereby frictionally engaging said flywheel assembly with said frictional engagement portion of said clutch disk assembly; and an inertia adding assembly having a mass portion configured to be operatively coupled to rotate in accordance with rotation of the input shaft of the transmission, a sub-clutch configured to be operatively coupled between said mass portion and the input shaft of the transmission to release an interlocked relationship between the input shaft of the transmission and said mass portion when said flywheel assembly and said frictional engagement portion of said clutch disk assembly are disengaged from each other, and an elastic portion elastically coupling the input shaft of the transmission and said mass portion in the rotating direction when said sub-clutch interlocks the input shaft of the transmission with said mass portion, said sub-clutch having, a torque transmission capacity (T) smaller than a torque transmitted between the frictional engagement portion of said clutch disk assembly and the coupling portion of said clutch disk assembly when the damper of said clutch disk assembly attains said angle of ($\theta_{max}$), said sub-clutch having a first part coupled to said mass portion, a second part configured to be coupled to the input shaft of the transmission and a release member adapted to be coupled to the input shaft of the transmission to axially move in response to axial movement of a release bearing, said sub-clutch further including a friction plate mounted to said release member and extending radially outwardly therefrom.

21. The coupling mechanism according to claim 20, wherein said sub-clutch further includes a sub-clutch housing coupled to said mass portion via said elastic portion.

22. The coupling mechanism according to claim 21, wherein said sub-clutch further includes a diaphragm spring extending between said sub-clutch housing and said release member.

23. The coupling mechanism according to claim 22, wherein said diaphragm spring is arranged to normally press said friction plate against said sub-clutch housing to releasably couple said mass portion to said release member.

24. A coupling mechanism for coupling a crankshaft of an engine and an input shaft of a transmission, comprising:

a flywheel assembly configured to be non-rotatably coupled to the crankshaft of the engine;

a clutch disk assembly having a frictional engagement portion, a coupling portion configured to be coupled to the input shaft of the transmission and a damper arranged between said frictional engagement portion and said coupling portion for dampening a torque variation of the engine, said damper having an allowable maximum operation angle of ($\theta_{max}$);

a clutch cover assembly fixedly coupled to said flywheel assembly for pressing said frictional engagement portion of said clutch disk assembly toward said flywheel assembly and thereby frictionally engaging, said flywheel assembly with said frictional engagement portion of said clutch disk assembly; and an inertia adding assembly having a mass portion configured to be operatively coupled to rotate in accordance with rotation of the input shaft of the transmission, a sub-clutch configured to be operatively coupled between said mass portion and the input shaft of the transmission to release an interlocked relationship between the input shaft of the transmission and said mass portion when said flywheel assembly and said frictional engagement portion of said clutch disk assembly are disengaged from each other, and an elastic portion elastically coupling the input shaft of the transmission and said mass portion in the rotating direction when said sub-clutch interlocks the input shaft of the transmission with said mass portion, said sub-clutch having a torque transmission capacity (T) smaller than a torque transmitted between the frictional engagement portion of said clutch disk assembly and the coupling portion of said clutch disk assembly when the damper of said clutch disk assembly attains said angle of ($\theta_{max}$), said sub-clutch having a first part coupled to said mass portion, a second part configured to be coupled to the input shaft of the transmission and a release member adapted to be coupled to the input shaft of the transmission to axially move in response to axial movement of a release bearing, said sub-clutch further including a sub-clutch housing coupled to said mass portion via said elastic portion.

* * * * *